United States Patent [19]

Andrews

[11] 4,323,151

[45] Apr. 6, 1982

[54] ARTICLE TRANSFER MECHANISM

[75] Inventor: Ralph L. Andrews, Hastings, Mich.

[73] Assignee: Gulf & Western Manufacturing Company, Southfield, Mich.

[21] Appl. No.: 907,125

[22] Filed: May 18, 1978

Related U.S. Application Data

[63] Continuation of Ser. No. 754,082, Dec. 23, 1976, abandoned.

[51] Int. Cl.³ .............................................. B65G 25/02
[52] U.S. Cl. .................................................... 198/740
[58] Field of Search ............... 198/430, 718, 719, 695, 198/696, 487, 740, 741, 745, 621

[56] References Cited

U.S. PATENT DOCUMENTS

| 1,426,039 | 8/1922 | Candee | 198/745 |
|---|---|---|---|
| 1,997,710 | 4/1935 | Wolf | 198/745 |
| 2,612,254 | 9/1952 | Carter | 198/696 |
| 2,737,285 | 3/1956 | Cookson et al. | 198/492 |
| 2,964,159 | 12/1960 | Boyer, Sr., et al. | 198/745 |
| 3,011,464 | 12/1961 | Danly et al. | 198/621 |
| 3,061,078 | 10/1962 | Davies | 198/621 |
| 3,077,259 | 2/1963 | Braun | 198/745 |
| 3,428,166 | 2/1969 | Burke et al. | 198/745 |
| 3,590,986 | 7/1971 | Andrews et al. | 198/696 |
| 3,661,247 | 5/1972 | Wallis | 198/621 |
| 3,910,422 | 10/1975 | Zierpka | 198/621 |

FOREIGN PATENT DOCUMENTS

969503  6/1975  Canada .............................. 198/740

Primary Examiner—Jeffrey V. Nase
Attorney, Agent, or Firm—Meyer, Tilberry & Body

[57] ABSTRACT

An article transfer mechanism is disclosed comprising a pair of longitudinally and laterally reciprocable feed bars having opposed cooperable article engaging feed fingers therebetween. The feed bars are supported at opposite ends for longitudinal sliding movement relative to feed bar support members which in turn are supported for linear lateral movement toward and away from one another. An oscillatory drive arrangement is provided at one end of the feed bars for reciprocating the bars longitudinally, and a rotatable cam and follower lever arrangement is provided at each end of the feed bars for reciprocating the support members and thus the feed bars laterally toward and away from one another.

13 Claims, 7 Drawing Figures

ARTICLE TRANSFER MECHANISM

This is a continuation of application Ser. No. 754,082 filed Dec. 23, 1976, now abandoned.

This invention relates to the art of material handling and, more particularly, to a reciprocating article transfer mechanism for advancing articles step by step along a linear feed path.

The present invention finds particular utility in connection with the step by step advancement of a workpiece relative to a plurality of work stations in a metalworking press. Accordingly, the invention will be described with regard to such use; however, it will be appreciated that the invention has utility in connection with transferring articles other than press workpieces and in conjunction with apparatus other than presses.

Transfer feed mechanisms have been provided heretofore for advancing workpieces step by step through a metalworking press such that a workpiece is picked up at one station, advanced to the next station and then released for the performance of work thereon by the press. Among such transfer mechanisms are those including a pair of longitudinally and laterally reciprocable feed bars having opposed pairs of cooperable feed fingers therebetween. The feed bars are adapted to be displaced laterally away from one another to release the fingers from engagement with an article, displaced longitudinally in one direction to position another set of fingers in alignment with the article, displaced laterally toward one another for the article to be received between the new pair of fingers, and then advanced longitudinally in the opposite direction to move the article to the next work station. Such movement is of course coordinated with the stroke of the press slide such that the engagement, transfer and release functions of the feed mechanism take place during the non-working portion of the total stroke of the press.

A variety of arrangements have been provided heretofore for imparting the longitudinal and lateral reciprocating motions to the feed bars and thus the feed fingers associated therewith. Such previous efforts have included cam and linkage assemblies including rotating cams and long linkage trains involving a number of pivotally interrelated component parts. Other arrangements have included oscillating levers and linkage trains, again involving a considerable number of pivotally interconnected component parts. In view of the longitudinal and lateral reciprocating motions imparted to the feed bars it is necessary to have separate drive mechanisms therefore which generally are driven from a common drive source such as the crankshaft of the press so as to coordinate the operation. Even though the mechanisms are driven by the press, a principal disadvantage of the mechanisms heretofore provided has been the inability to time the separate longitudinal and lateral displacements with sufficient precision for high speed press operation. In this respect, links, levers, bell cranks and the like, introduce errors through long chains of action which effect the ability to achieve and maintain desired timing relationships between the longitudinal and lateral displacements. Further, operation of a feed transfer mechanism is continuous and accordingly requires a continuous and repeated change of direction with respect to the feed bars. In connection with this requirement, the drive arrangements heretofore provided consume a considerable amount of energy as a result of heavy links, levers, bell cranks and the like, whereby high frictional losses are encountered which hinder high speed operation. Thus, the inability to obtain close coordinated action of the longitudinal and lateral drives for the feed bars heretofore has impeded the use of such feed mechanisms in high speed presses.

The foregoing and other difficulties and disadvantages encountered in connection with previous transfer feed mechanisms are overcome or minimized in accordance with the present invention by an improved arrangement for achieving lateral displacement of the feed bars which minimize energy loss and enables improved timing capabilities and thus higher speed press operation than heretofore possible. More particularly in accordance with the present invention, a continuously rotating cam is associated with the feed bars for achieving relative lateral displacement therebetween. This continuous rotating drive arrangement enables optimizing timing of such lateral reciprocation and thus coordination thereof with longitudinal reciprocation of the feed bars. Moreover, by maximizing rotary motion to achieve lateral displacement of the feed bars, energy losses heretofore encountered through long linkage trains is minimized. Further, by use of a cam in accordance with the preferred embodiment of the invention, two in and out motions of the feed bars are realized for each revolution of the cam, thus further reducing energy losses heretofore encountered and reducing inertia loads on the cam, thus enabling higher speed press operation. Still further, reciprocating movement of the feed bars is preferably achieved through use of rotary-to-oscillatory drive mechanism, whereby the input to the separate drive mechanisms for achieving lateral and longitudinal reciprocation are both rotary. This enables optimizing the timing between the lateral and longitudinal reciprocating movement of the feed bars.

It is accordingly an outstanding object of the present invention to provide an improved drive arrangement for a transfer feed mechanism involving longitudinal and lateral reciprocating movements of feed bars.

Another object is the provision of an improved drive arrangement of the foregoing character in which the use of rotary motion is optimized to achieve longitudinal and lateral reciprocation of the feed bars.

Yet another object is the provision of a drive arrangement of the foregoing character which minimizes energy losses and inertia on the component parts, thus to enable higher speed operation of the transfer feed mechanism than heretofore possible.

Still another object is the provision of a drive arrangement of the foregoing character which enables more accurate timing and close coordination with respect to the longitudinal and lateral reciprocating movements imparted to the feed bars.

Still another object is the provision of a drive arrangement of the foregoing character in which lateral reciprocation of the feed bars is achieved by a cam drive arrangement which enables reducing the number of moving parts required to achieve the desired lateral movements of the feed bars and thus decreases frictional losses and inertial forces on the component parts to improve accuracy with respect to coordinating drives for the lateral and longitudinal movements and to enable higher speed operation than heretofore possible.

The foregoing objects, and others, will in part be obvious and in part pointed out more fully hereinafter in conjunction with the written description of a preferred embodiment of the invention illustrated in the accompanying drawings in which:

Figure 1:
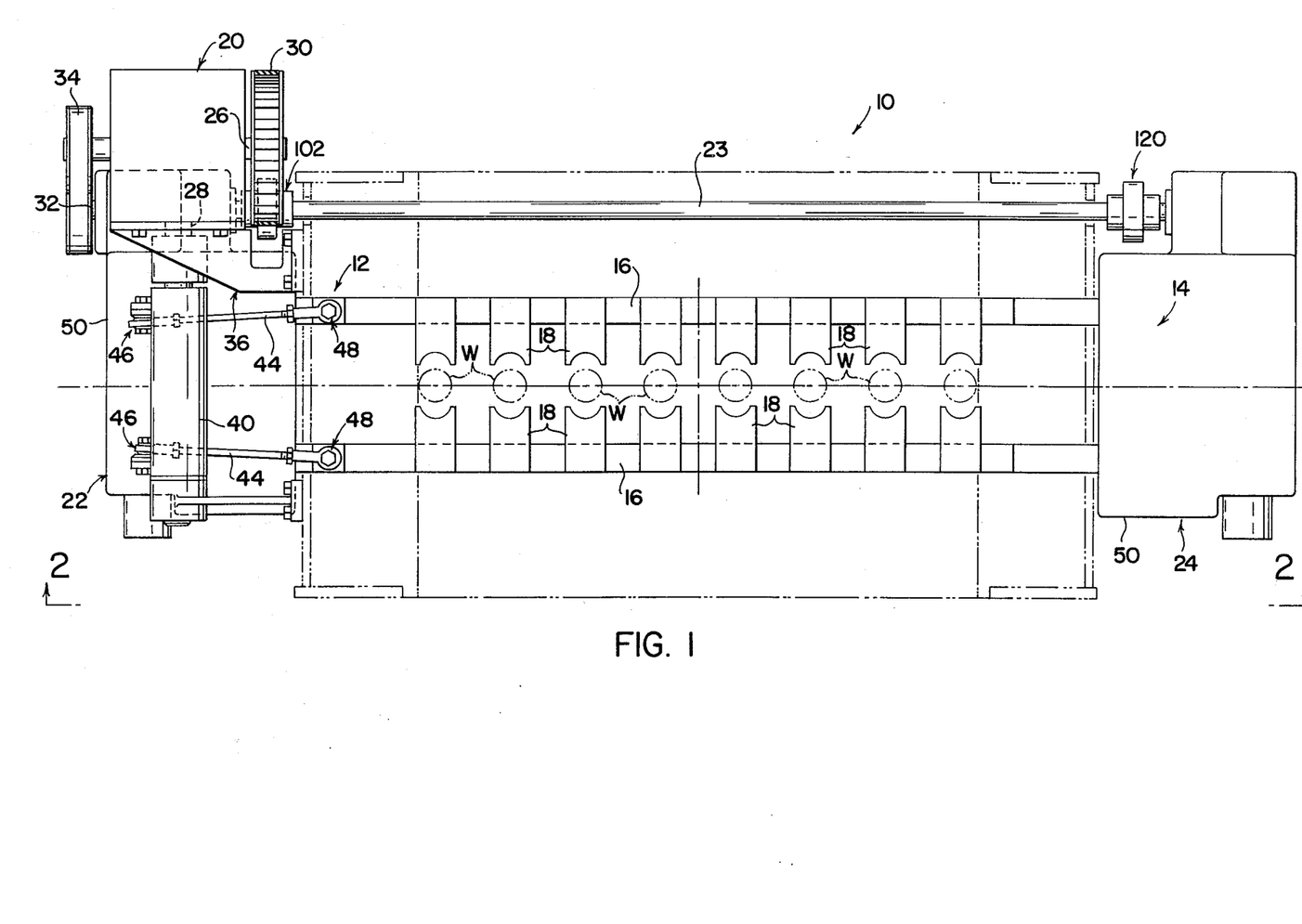
FIG. 1 is a plan view of a transfer feed mechanism in accordance with the present invention.
Figure 2:
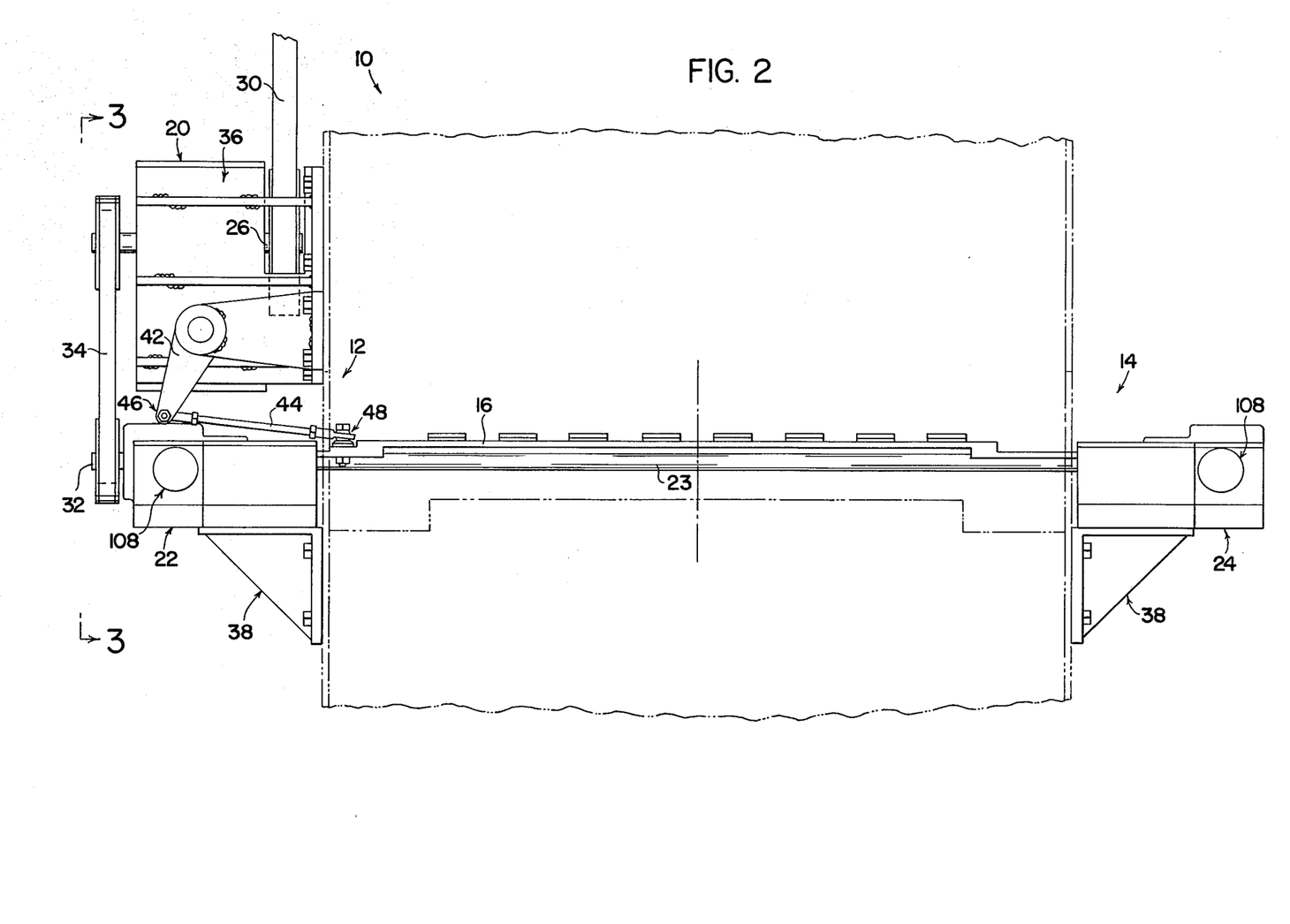
FIG. 2 is a side elevation view of the mechanism looking in the direction of line 2—2 in FIG. 1.
Figure 3:
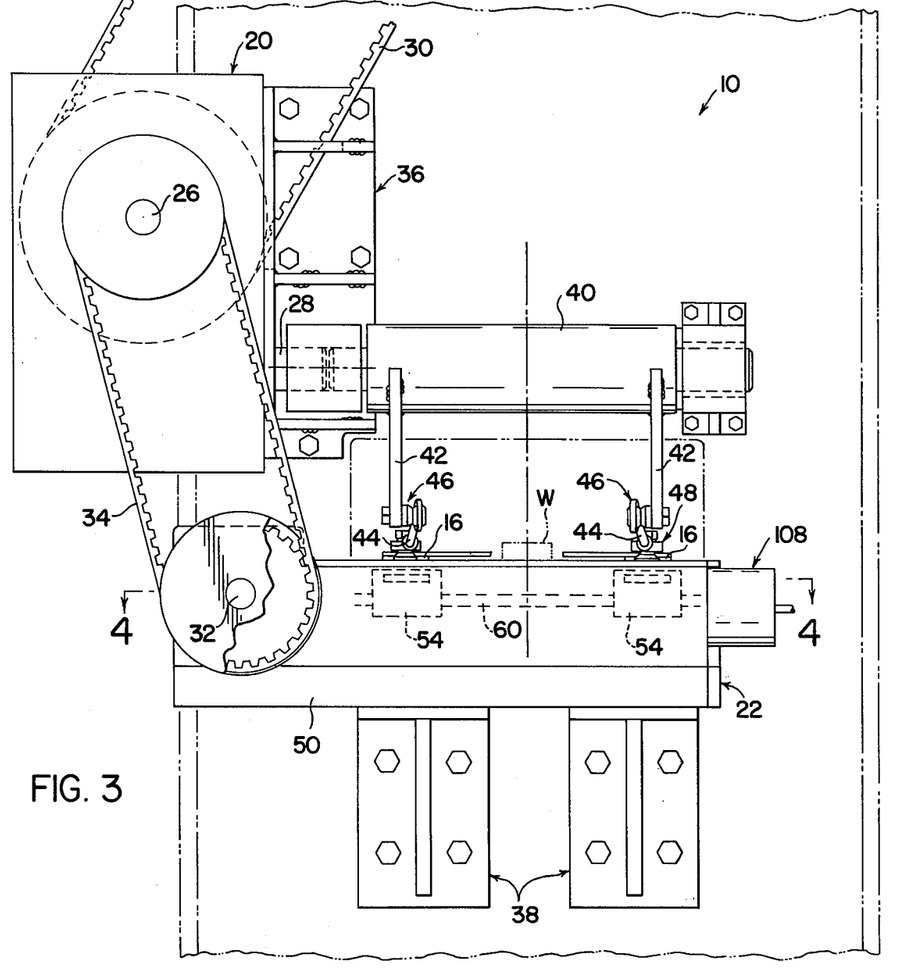
FIG. 3 is an end elevation view of the mechanism as seen along line 3—3 in FIG. 2.

Referring now in greater detail to the drawings wherein the showings are for the purpose of illustrating a preferred embodiment of the invention only and not for the purpose of limiting the same, FIGS. 1-3 illustrate a transfer feed mechanism for use with a press in which a workpiece is to be transferred step by step to a plurality of successive work stations between opposite sides of the press. As is well known in the art, workpieces are conveyed to the input end of the transfer mechanism and are moved step by step across the press bed or a bolster plate thereon to the exit end of the transfer mechanism at which point the workpieces are picked up by a suitable discharge conveying mechanism. Accordingly, it it will be appreciated with regard to FIGS. 1-3 that the transfer feed mechanism designated generally by the numeral 10 is mounted on the press frame to span the press bed such that workpieces W are transferred across the press bed from input end 12 to discharge end 14 of the transfer mechanism. Basically, the transfer feed mechanism includes a pair of parallel feed bars 16 carrying a plurality of opposed pairs of feed fingers 18 along the lengths thereof. Typically, bars 16 are reciprocated longitudinally and laterally in a pattern which provides for fingers 18 to move laterally apart to release a workpiece therebetween, to move longitudinally in the direction of input end 12 of the mechanism, to move laterally inwardly to grip a new workpiece therebetween, and then to move longitudinally in the direction of output end 14 of the mechanism to transfer the workpiece to the next work station.

In the embodiment illustrated, feed bars 16 are longitudinally reciprocated by means of a drive unit 20 at the input end of the feed mechanism and are laterally reciprocated by means of a drive unit 22 at the input end of the mechanism and a similar drive unit 24 at the discharge end of the drive unit and which is driven in synchronism with drive unit 22 through a cross shaft 23 therebetween. As will be described in greater detail hereinafter, the opposite ends of feed bars 16 are supported for longitudinal and lateral reciprocation relative to the press bed by components of drive units 22 and 24.

Drive unit 20 is a mechanism adapted to translate rotary motion into oscillating motion and, in the preferred embodiment, is a well known and commercially available Ferguson Cam Box. As is well known in the art, such a unit has a rotatable input shaft 26 and an output shaft 28 which oscillates in response to rotation of shaft 26. In connection with the transfer feed mechanism of the present invention, one end of input shaft 26 is connected to the press crankshaft, not shown, through a timing belt 30 so that oscillation of output shaft 28 is timed with respect to the press drive. Input shaft 26 extends through the cam box and the other end of the shaft is connected with an input shaft 32 of drive unit 22 through a timing belt 34. The timing belt provides for the operation of drive units 22 and 24 to be synchronized with the oscillating movements of output shaft 28 of drive unit 20. It will be appreciated of course that drive unit 20 is suitably mounted on the press frame such as by a bracket assembly 36 and that drive units 22 and 24 are likewise suitably mounted on the press frame such as by corresponding bracket assemblies 38. Output shaft 28 of drive unit 20 is coupled to a member 40 provided with a pair of laterally spaced apart arms 42, and feed bars 16 are reciprocated together longitudinally by means of corresponding wobble links 44 coupled to arms 42 by universal couplings 46 and to feed bars 16 by universal couplings 48.

In accordance with the present invention, feed bars 16 are laterally reciprocated relative to one another and to the press bed by means of drive units 22 and 24. The latter drive units are substantially identical in structure and operation and the differences therebetween will be apparent and will be pointed out hereinafter in conjunction with the description of drive unit 22 illustrated in FIGS 4-6 of the drawing. With regard to the latter Figures, drive unit 22 includes a housing 50 provided with a cover 52. The end of housing 50 facing the press is open to receive the corresponding ends of feed bars 16, and the latter ends of the feed bars are longitudinally slidably received in corresponding feed bar support members 54. More particularly, each member 54 is provided with a recess 55 slidably receiving the corresponding feed bar and which recess is covered by a plate 56 to retain the feed bar against upward displacement relative to the support members. Each support member 54 is provided with a pair of parallel laterally extending openings 58 receiving corresponding laterally extending guide rods 60 having opposite ends fastened in place with respect to housing 50 such as by corresponding bracket 62. Preferably, bearing sleeves 64 are interposed between openings 58 and rods 60 to enhance lateral sliding of support members 54 along the guide rods.

Figure 4:
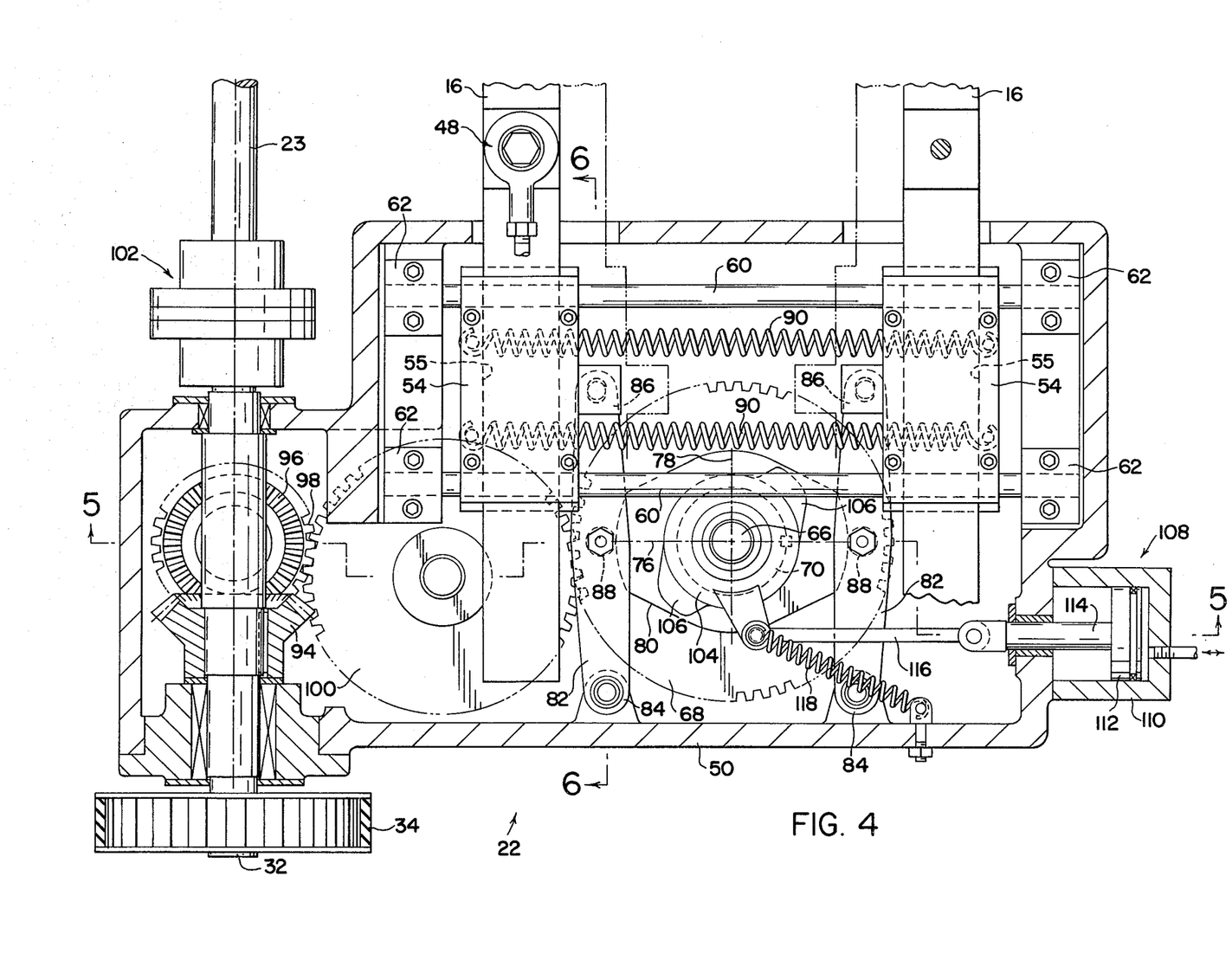
FIG. 4 is a plan view, partially in section, of the drive arrangement by which the feed bars are laterally reciprocated as seen along line 4—4 in FIG. 3.
Figure 5:
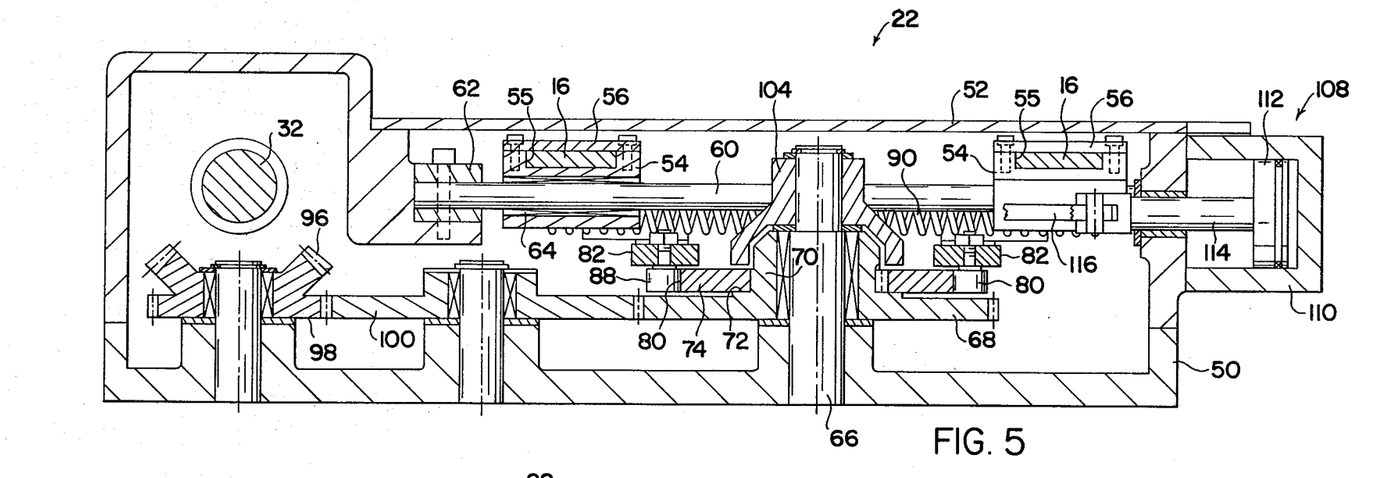
FIG. 5 is a sectional elevation view taken along line 5—5 in FIG. 4.
Figure 6:
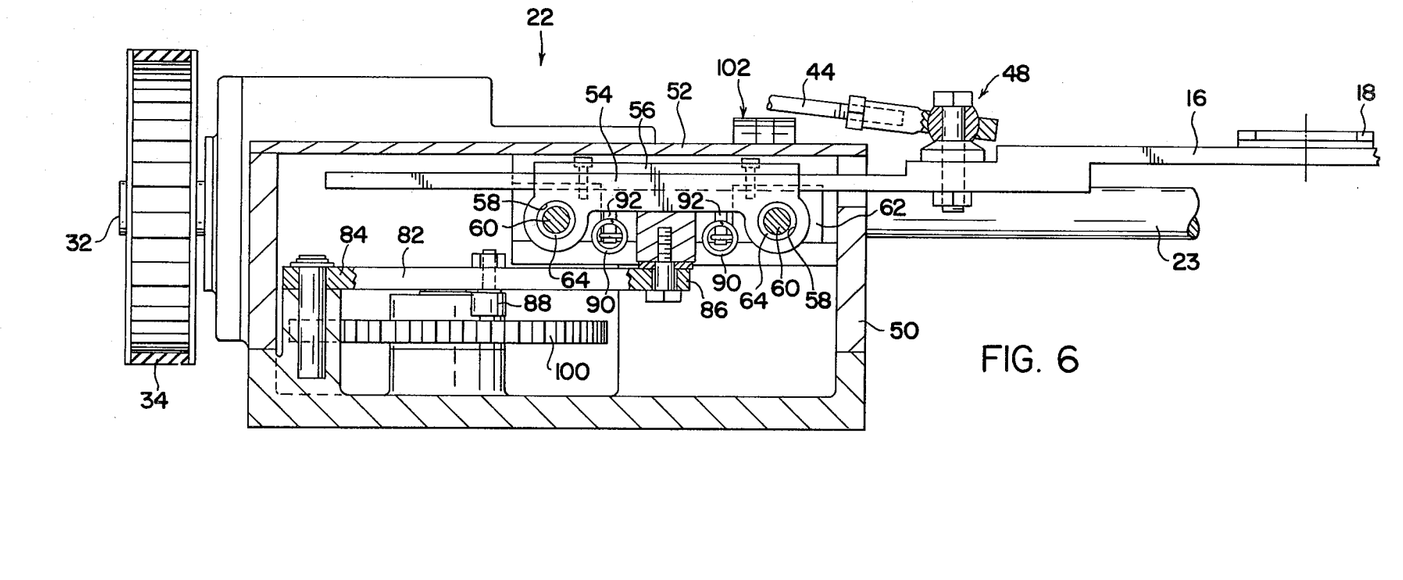
FIG. 6 is a sectional elevation view taken along line 6—6 FIG. 4.

Housing 50 is further provided with a circular post 66 which is fixed relative to the housing and which supports a driven gear 68 for rotation about the vertical axis of post 66. Gear 68 has a hub portion 70 providing a shoulder 72, and an apertured cam member 74 receives hub 70 and rests on shoulder 72. Cam 74 is suitably attached to gear 68, such as by a shrink fit therebetween, so that the cam is rotatable with the gear. Cam 74 is a double cam having a major axis 76 and a minor axis 78 and a peripheral cam surface 80 which is identical in each of the four quadrants defined by the major and minor axes.

A pair of follower levers 82 are disposed between cam 74 and a corresponding one of the feed bar support members 54. Each lever 82 has one end 84 pivotally interconnected with housing 50 and its other end 86 interconnected with the corresponding support member 54 for sliding engagement therewith. Further, each lever is provided intermediate its opposite ends with depending follower rollers 88, which rollers engage diametrically opposite sides of cam surface 80 of cam 74. Follower rollers 88 are biased toward cam surface 80 by means of a pair of tension springs 90 each having their opposite ends connected to one of the feed bar support members 54 such as by means of pins 92.

Figure 4A:
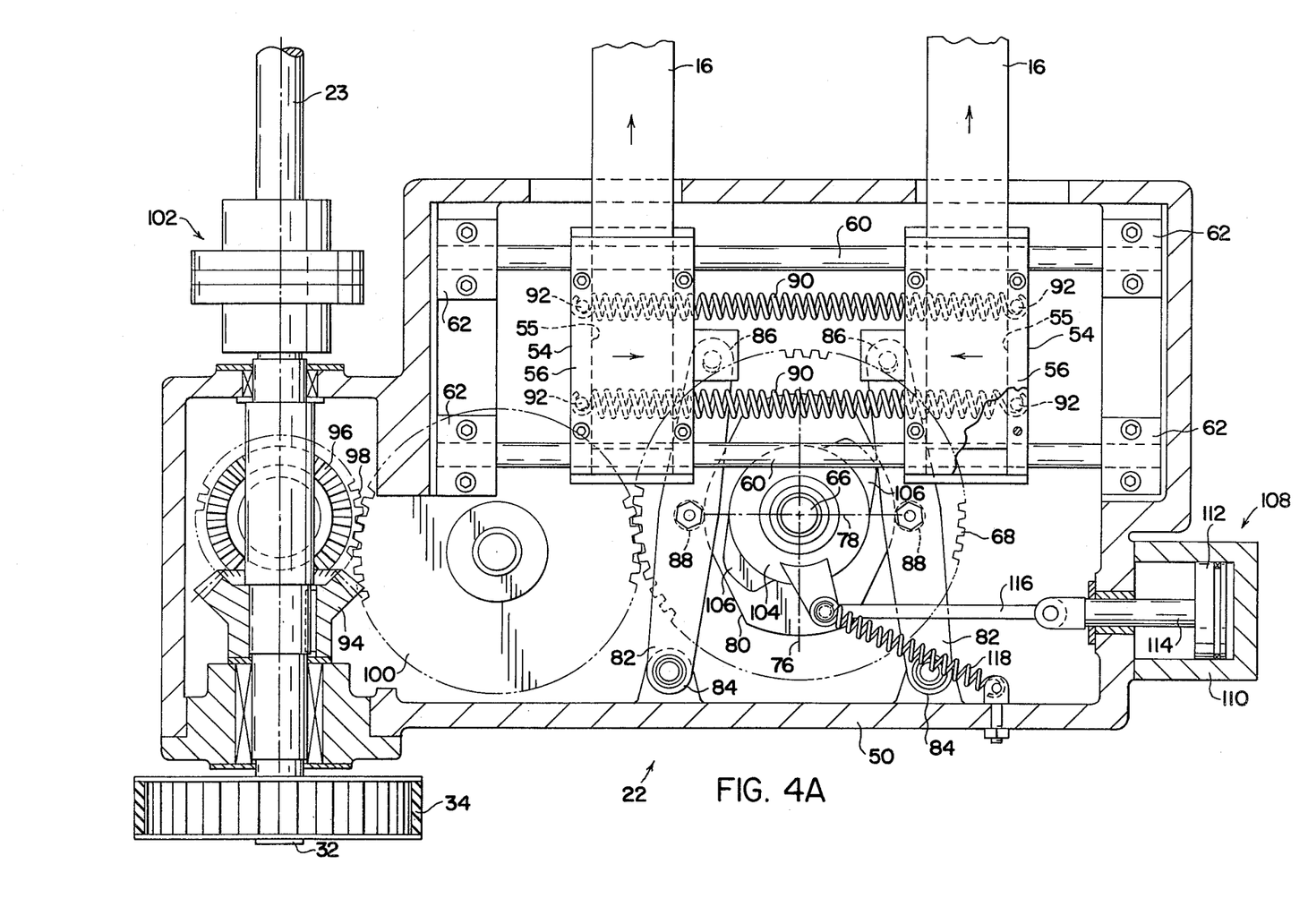
FIG. 4A is a view similar to FIG. 4 but showing the component parts in different positions.

It will be appreciated from the description thus far of drive unit 22 that rotation of gear 68 rotates cam 74 about the axis of post 66 and that such rotation of the cam imparts reciprocating movement to feed bar support members 54 laterally toward and away from one another. It will be appreciated too that when the cam component is in the position illustrated in FIG. 4 support members 54 are in the positions of maximum lateral spacing therebetween, and when the cam component is in the position illustrated in FIG. 4A support members 54 are in the positions of minimum lateral spacing therebetween. It will be further appreciated that double cam 74 provides for lateral outward and inward movement of members 54 twice for each revolution of the cam, that the cam drives support members 54 outwardly against the bias of springs 90, and that the springs return the support members inwardly as the cam rotates from the position of FIG. 4 to that of FIG. 4A.

Gear 68 is adapted to be rotated constantly through a gear train driven in response to rotation of input shaft 32 and including, in sequence from input shaft 32, gears 94, 96, 98 and 100. As mentioned hereinabove, drive units 22 and 24 are adapted to be driven in synchronism through cross shaft 23. Input shaft 32 of drive unit 22 extends through housing 50, and it will be seen from FIG. 4 that input shaft 32 is coupled with cross shaft 23 by means of a suitable coupling 102.

Drive unit 22 further includes an auxiliary cam 104 having cam lobes 106 normally positioned as shown in FIG. 4. Cam 104 is mounted on post 66 for rotation relative thereto and relative to cam 74, and lobes 106 are coplanar with levers 82. When feed bar support members 54 are in the laterally inward positions shown in FIG. 4A, cam 104 is adapted to be pivoted to displace lobes 106 into engagement with the sides of levers 82. This displaces the levers 82 and thus support members 54 laterally outwardly independent of cam 74. This provides for an energency release of the feed fingers of feed bars 16 relative to workpieces therebetween in the event a malfunction or other emergency condition.

In the embodiment shown, cam 104 is adapted to be pivoted clockwise as viewed in FIG. 4 to achieve such spreading of the feed bars by means of a pneumatic piston and cylinder unit 108. More particularly, unit 108 includes a cylinder 110 mounted on housing 50 and supporting a reciprocable piston 112 having a piston rod 114 extending through an opening in the housing. The inner end of piston rod 114 is connected with cam 104 by means of a connecting link 116 having its opposite ends pivotally interconnected one with the piston rod and the other with cam 104. Return movement of cam 104 to the position shown in FIG. 4 is achieved through a tension spring 118 having its opposite ends connected to cam 104 and housing 50. It will be appreciated of course that cylinder 110 is connected to a suitable source of air under pressure, not shown.

As mentioned hereinabove, drive units 22 and 24 are substantially identical in structure. In fact, the only difference is a reversal of the positions of the component parts to provide for unit 24 to be driven from the same side as the input to unit 22, and to position auxiliary cam actuator 108 for unit 24 on the same side as that of unit 22. It will appreciated that cross shaft 23 is connected through a coupling 120 with an input shaft of drive unit 24 equivalent to input shaft 32 of unit 22. Accordingly, rotation of input shaft 32 of unit 22 imparts identical rotation to the input shaft of unit 24, whereby the two units are driven in synchronism to achieve simultaneous lateral reciprocation of feed bars 16 outwardly and inwardly relative to one another. It will be appreciated too that piston cylinder units 108 of drive units 22 and 24 can be connected to a common source of air under pressure and can be operated together.

It will be understood from the foregoing description that the transfer feed mechanism is operated through the press and in timed coordination therewith through timing belt 30. Further, it will be appreciated that the operation of drive unit 20 is coordinated with the operation of drive units 22 and 24 through timing belt 24 between units 20 and 22. Thus, rotation of timing belt 30 through operation of the press imparts oscillating movement to output shaft 28 to reciprocate feed bars 16 longitudinally relative to the press and rotation of input shaft 32 of drive unit 22 through timing belt 34 causes reciprocation of the feed bars laterally relative to one another in timed coordination with such longitudinal reciprocation. Therefore, during a cycle of operation feed bars 16 are displaced longitudinally in one direction while in their laterally inward positions, are displaced laterally outwardly relative to one another, are displaced longitudinally in the opposite direction, and are displaced laterally inwardly toward one another to complete the cycle. During each cycle of movement double cam 74 rotates one-half revolution. It will be appreciated, therefore, that the press will perform two working operations for each full revolution of cam 74, thus minimizing the inertia of working parts of drive units 22 and 24 relative to that which would be encountered with mechanisms requiring a complete cycle of operation of these parts with each cycle of press operation. Additionally, it will be appreciated that a continuous rotational drive for units 22 and 24 with minimum use of linkage arrangements between the various component parts thereof minimizes energy losses and inaccuracies in timing with regard to coordinating movements of the feed bars in the longitudinal and lateral directions.

While considerable emphasis has been placed herein on the specific structure and structural interrelationships between the component parts of drive units 22 and 24, it will be appreciated that many modifications can be made in the structures shown and described without departing from the principles of the present invention. Accordingly, it is to be distinctly understood that the foregoing descriptive matter is to be interpreted merely as illustrative of the present invention and not as a limitation.

What is claimed is:

1. In an article transfer mechanism of the character comprising, a pair of horizontal feed bars laterally spaced apart from one another and having cooperable feed fingers therebetween, feed bar support members each supporting one of said feed bars for longitudinal reciprocation relative thereto, means supporting said feed bar support members for linear reciprocation laterally toward and away from one another, means to reciprocate said feed bars longitudinally relative to said feed bar support members, and means to reciprocate said support members and feed bars laterally toward and away from one another, the improvement comprising: said means to reciprocate said support members and feed bars including a rotatable planar cam between said support members, said cam rotating about a vertical cam axis laterally centrally between said support members, said cam having a peripheral cam surface symmetric with respect to said cam axis and having major and minor axes, follower means interengaging said cam surface with each said support member, biasing means biasing said follower means into engagement with said cam surface, and means to rotate said cam for said follower means and said biasing means to displace said support members and feed bars laterally toward and away from one another, said means supporting said support members including housing means and said follower means including laterally pivotal follower lever means each laterally between and interengaging said planar cam and one of said support members, each said follower lever means including a follower lever having opposite ends, one of said lever ends being interconnected with said housing means for pivotal movement about a vertical axis and the other of said lever ends slidably engaging the corresponding support member.

2. The improvement according to claim 1, wherein a vertical plane laterally through said vertical axis of said planar cam is disposed between said opposite ends of said follower levers, said follower lever means further including a follower roller on each said lever between the opposite ends of the lever and engaging said cam surface.

3. The improvement according to claim 1, wherein said biasing means is spring means interconnecting and biasing said support members toward one another.

4. The improvement according to claim 3, wherein said feed bars have opposite ends, said housing means, support members, follower lever means, planar cam, and spring means being provided at each of said opposite ends, and means interconnecting said planar cams at said opposite ends for synchronous rotation.

5. The improvement according to claim 4, wherein a vertical plane laterally through said vertical axis of said planar cam is disposed between said opposite ends of said follower levers, said follower lever means further including a follower roller on each said lever between the opposite ends of the lever and engaging said cam surface.

6. In an article transfer mechanism of the character comprising, a pair of horizontal feed bars laterally spaced apart from one another and having cooperable feed fingers therebetween, feed bar support members each supporting one of said feed bars for longitudinal reciprocation relative thereto, means supporting said feed bar support members for linear reciprocation laterally toward and away from one another, means to reciprocate said feed bars longitudinally relative to said feed bar support members, and means to reciprocate said support members and feed bars laterally toward and away from one another, the improvement comprising: said means to reciprocate said support members and feed bars including a rotatable planar cam between said support members, said cam rotating about a vertical cam axis laterally centrally between said support members, said cam having a peripheral cam surface symmetric with respect to said cam axis and having major and minor axes, follower means interengaging said cam surface with each said support member, biasing means biasing said follower means into engagement with said cam surface, means to rotate said cam for said follower means and said biasing means to displace said support members and feed bars laterally toward and away from one another, said means supporting said support members including housing means and said follower means including laterally pivotal follower lever means each laterally between and interengaging said planar cam and one of said support members, each said follower lever means including a follower lever having opposite ends, one of said lever ends being interconnected with said housing means for pivotal movement about a vertical axis and the other of said lever ends slidably engaging the corresponding support member, said biasing means being spring means interconnecting and biasing said support members toward one another, said feed bars having opposite ends, said housing means, support members, follower lever means, planar cam, and spring means being provided at each of said opposite ends, means interconnecting said planar cams at said opposite ends for synchronous rotation, and pivotal cam means between said feed bars at each of said opposite ends and operable independent of said rotatable planar cams to displace the corresponding ends of said feed bars laterally away from one another against the bias of said spring means, and means to pivot said pivotal cam means.

7. An article transfer mechanism comprising, a pair of laterally spaced apart feed bars having cooperable feed fingers therebetween, feed bar support members each supporting one of said feed bars for longitudinal reciprocation, means supporting said support members for linear reciprocation laterally toward and away from one another, means to reciprocate said feed bars longitudinally relative to said support members, means to reciprocate said support members laterally toward and away from one another including rotatable cam means between said support members and follower means between said cam means and each support member, each said follower means interengaging said cam means and the corresponding support member for said follower means to displace said support members laterally in response to rotation of said cam means, said follower means including means biasing said support members laterally toward one another, said cam means displacing said support members laterally away from one another against said bias, pivotal cam means between said feed bars selectively operable independent of said rotatable cam means to displace said feed bars and support members laterally away from one another against said bias, and means to pivot said pivotal cam means.

8. The transfer mechanism according to claim 7, wherein said rotatable and pivotal cam means are coaxial.

9. The transfer mechanism according to claim 8, wherein said means for pivoting said pivotal cam means includes pneumatic motor means and spring means, said motor means pivoting said pivotal cam means in one direction and said spring means biasing said pivotal cam means in the opposite direction.

10. The transfer mechanism according to claim 7, wherein said means supporting said support members includes housing means and wherein said follower means includes a follower lever laterally between said rotatable cam means and each said support member, each said follower lever having opposite ends, one of said ends being pivotally interconnected with said housing means and the other of said ends slidably engaging the corresponding support member, said pivotal cam means displacing said follower levers to displace said feed bars away from one another.

11. The transfer mechanism according to claim 10, wherein said rotatable and pivotal cam means are coaxial.

12. The transfer mechanism according to claim 11, wherein said means for pivoting said pivotal cam means includes pneumatic motor means and spring means, said motor means pivoting said pivotal cam means in one direction and said spring means biasing said pivotal cam means in the opposite direction.

13. The transfer mechanism according to claim 7, wherein said means to pivot said pivotal cam means includes pneumatic motor means and spring means, said motor means pivoting said pivotal cam means in one direction and said spring means biasing said pivotal cam means in the opposite direction.

* * * * *